UNITED STATES PATENT OFFICE.

EUGENE H. LEWIS, OF ST. JOSEPH, MICHIGAN, ASSIGNOR TO THE MICHIGAN SAND BRICK COMPANY, OF SAME PLACE.

PROCESS OF AND COMPOSITION FOR MANUFACTURING SAND BRICKS.

SPECIFICATION forming part of Letters Patent No. 471,844, dated March 29, 1892.

Application filed May 29, 1891. Serial No. 394,511. (No specimens.)

*To all whom it may concern:*

Be it known that I, EUGENE H. LEWIS, a citizen of the United States, residing at St. Joseph, in the county of Berrien and State of Michigan, have invented certain new and useful Improvements in the Process of and Composition for Manufacturing Sand Bricks; and I do hereby declare the following to be a full, clear, and exact description of the invention, such as will enable others skilled in the art to which it appertains to make and use the same.

My invention relates to artificially-prepared building material; and it consists of improvements in the process of and composition for manufacturing sand brick.

My composition consists of the following ingredients, combined in or about the proportions stated, viz: cement, one part; lime, three and one-half parts; sand, sixty-seven parts. The above ingredients are thoroughly mixed and then moistened with the following solution until the mixture is reduced to a semi-plastic condition, viz: water, forty gallons; alum, twelve pounds; sulphuric acid, two quarts. When the solution has been properly mixed, I add silicate of soda, forty pounds.

In making this composition I first take the cement, lime, and sand and thoroughly mix the same by agitation or otherwise until they have been thoroughly commingled. Then I take a solution of alum dissolved in water and sulphuric acid, to which silicate of soda has been added, and mix it with the above mixture until it is reduced to a semi-plastic state. The composition is then ready to be pressed into bricks or manufactured into other desirable articles. These parts provide a new and desirable composition which can be readily manufactured by pressure or otherwise into bricks for ornamental or ordinary purposes, and it may also be used in manufacturing various other articles and for many different purposes.

I have found by practical experiment that a brick constructed in accordance with my invention is harder and will withstand the action of heat and frost better than other bricks known to the art, and these bricks can be constructed more cheaply than the ordinary ornamental brick. I also find that these bricks will take color better than other bricks and will retain a delicate and distinct tint. Thus the disadvantage of retaining the original tint of the sand is easily overcome.

What I claim, and desire to secure by Letters Patent, is—

1. The herein-described composition of matter, consisting of cement, lime, sand, water, alum, sulphuric acid, and silicate of soda in or about the proportions specified.

2. The herein-described process of making bricks, which consists, first, in thoroughly mixing cement, lime, and sand in or about the proportions specified; secondly, reducing said mixture to a semi-plastic state with a solution of water, alum, and sulphuric acid, and, thirdly, adding silicate of soda, as and for the purpose specified.

In testimony whereof I affix my signature in presence of two witnesses.

EUGENE H. LEWIS.

Witnesses:
C. O. PARMELE,
J. W. FLETCHER.